1,851,654

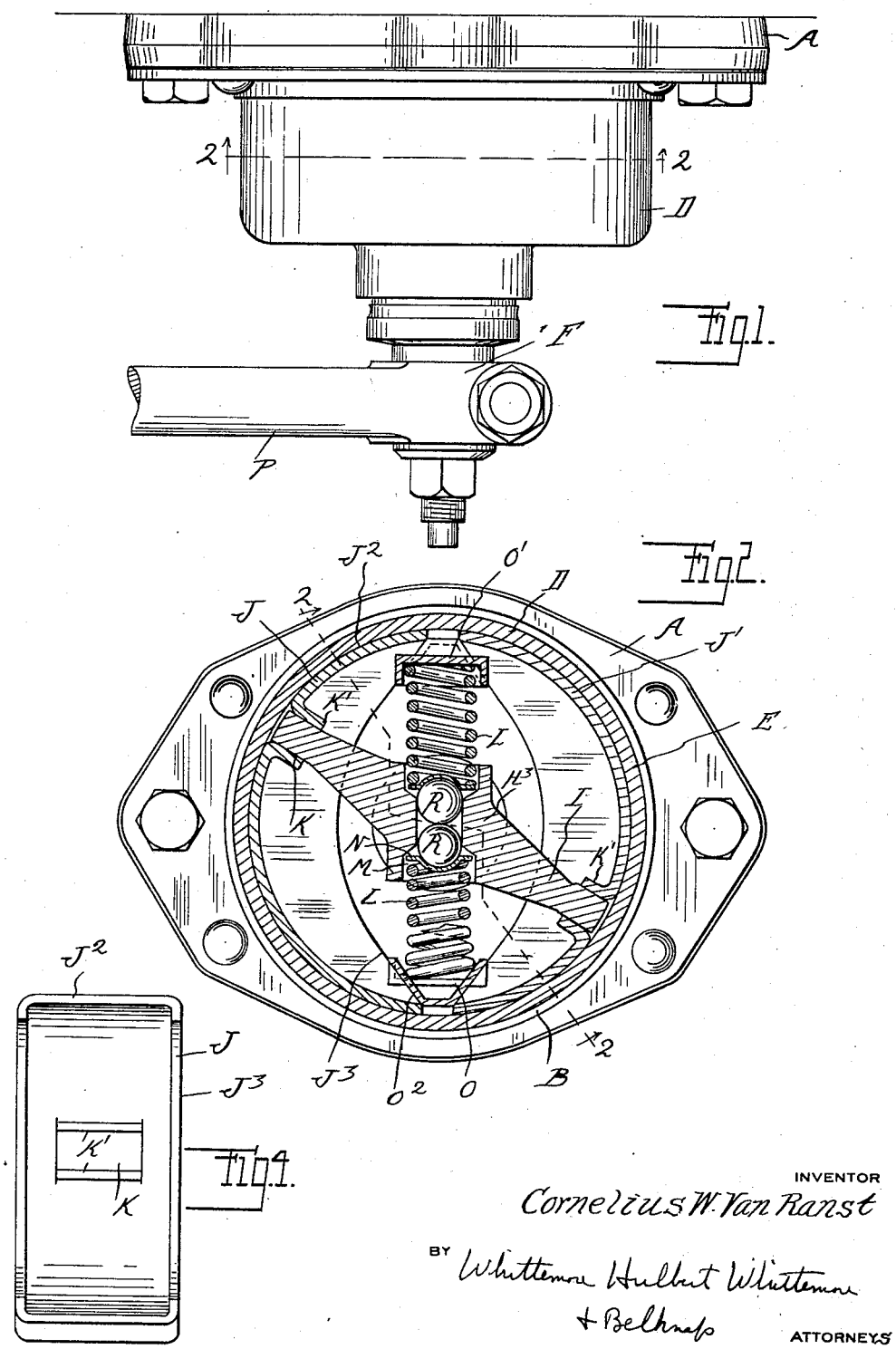
March 29, 1932. C. W. VAN RANST 1,851,654
SHOCK ABSORBER
Filed July 7, 1930  2 Sheets-Sheet 1
INVENTOR
Cornelius W. Van Ranst March 29, 1932.  C. W. VAN RANST  1,851,654
SHOCK ABSORBER
Filed July 7, 1930   2 Sheets-Sheet 2
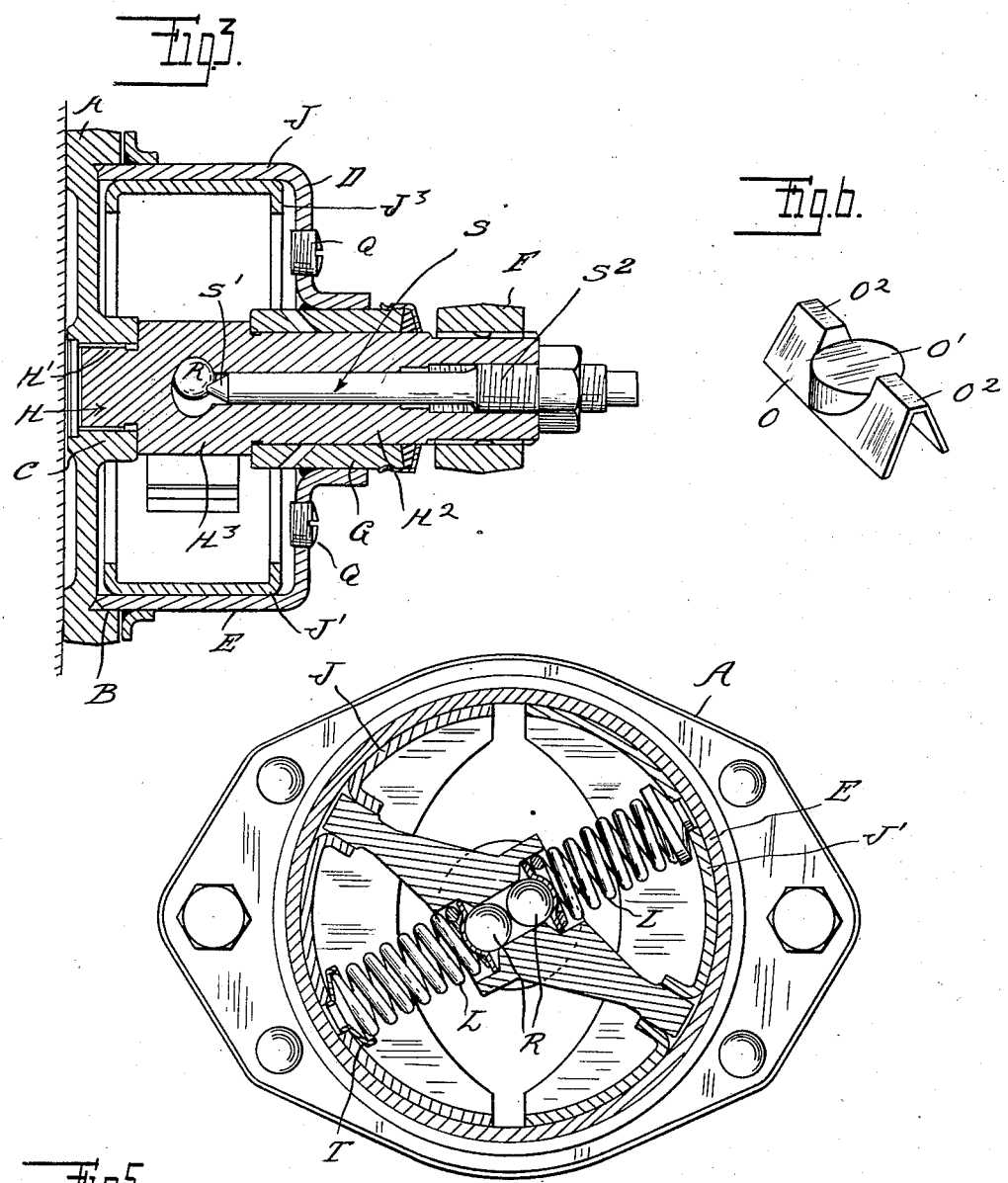
INVENTOR
Cornelius W. Van Ranst
BY
Whittemore Hulbert Whittemore
+ Belknap   ATTORNEYS Patented Mar. 29, 1932

UNITED STATES PATENT OFFICE

CORNELIUS W. VAN RANST, OF DETROIT, MICHIGAN

SHOCK ABSORBER

Application filed July 7, 1930. Serial No. 466,202.

The invention relates to shock absorbers and has for its object the obtaining of a construction which will frictionally resist both the compression and rebound movements of the vehicle spring but to a variable degree and with a greater resistance to the rebound than to the original compression. Further objects of the invention are to increase the resisting force with increase in amplitude of oscillation; to obtain a self-energizing construction; to provide for adjustment in the initial seating of the device and finally, to obtain a simple and inexpensive construction from a manufacturing standpoint. With these objects in view the invention consists in the construction as hereinafter set forth.

In the drawings:

Figure 1 is a plan view;

Figure 2 is a vertical central section on line 2—2 of Figure 1;

Figure 3 is a longitudinal section on line 3—3 of Figure 2;

Figure 4 is an elevation of one of the friction shoes;

Figure 5 is a view similar to Figure 2 showing a modified construction and

Figure 6 is a perspective view of one of the wedge shoes.

Generally described, my improvement comprises a housing including a cylindrical drum, an oscillatory shaft arranged concentric therewith and extending outward through a journal bearing, a rock arm for oscillating said shaft and friction shoes for engaging the inner surface of the drum which are actuated by the oscillatory shaft and which resist the movement thereof. More in detail, A is a plate adapted to be attached to any suitable point on the vehicle frame and which is formed with a circular recess B therein and a journal bearing C concentric with this recess. D is a cup shaped housing member having a cylindrical portion E which fits within the circular recess B, said housing being also provided with a hub portion F for supporting a bushing G. H is a shaft having a portion H' engaging the bearing C, a portion H² for engaging the bushing G, and an intermediate portion H³ carrying a rock arm I preferably formed integral therewith. This rock arm extends diametrically of the cylindrical housing E and forms an actuating member for a pair of brake shoes J and J'. These shoes are preferably formed of pressed sheet metal with segmental peripheral portions J² fitting within the drum E and inturned flanges J³ at the opposite sides thereof which are of greatest depth in the center and taper therefrom towards the opposite ends. At one point in the length of the shoe is an aperture K in the periphery thereof having inturned flanges K' on opposite sides for engaging an end of the rock arm I. Each of the shoes is pressed against the inner face of the drum by a spring L which as shown in Figure 2 is seated at its inner end in a recess M in the portion H³ of the shaft and against a disk N within said recess. The outer end of the spring engages a wedge shaped shoe O between the brake shoes J and J'. This shoe is formed of sheet metal to have a central portion O' bearing against the spring and the wedge shaped end portions O² for engaging the flanges J³ of the shoes J and J', the arrangement being such that the pressure of the spring against the wedge shoe O tends to hold the brake shoes in frictional engagement with the drum.

With the construction as thus far described, in use a rock arm P is attached to the outer end of the shaft H and the device is suitably mounted on the vehicle as in the usual manner with the plate A and rock arm P attached, the one to the vehicle frame and other to the axle or unsprung part. Oil or other lubricant is preferably placed within the housing D as by means of removable plugs Q. Whenever there is a vertical oscillation of the sprung portion of the vehicle this will cause a rocking of the shaft H in the bearings C and G and through the medium of the rock arm I this will tend to rotate the shoes J and and J' within the drum. Such movement is resisted by the friction of the shoes against the cylindrical wall E and this friction is due to the pressure of the wedge shoes O between the ends of the friction shoes and under the tension of the springs L. Thus rotation of the shoes in either direction will be frictionally resisted.

To produce the easiest riding effect it is desirable to permit a relatively free compression movement of the vehicle springs but it is essential to resist the rebound or recoil of this spring to avoid throwing of the vehicle body. My improved construction accomplishes this result by proportioning the frictional resistance of the shoes in opposite directions of rotation of the shaft so that there is a preponderance of resistance to the rotation under recoil of the vehicle spring. The means for effecting this is the location of the bearings on the shoes engaging the rock arm I nearer the forward end of the shoe in the direction of rotation under compression of the vehicle spring than to the opposite ends of the shoe which constitutes the forward end in the reverse rotation. It is well understood that in the actuation of a segmental brake shoe there will be a so-called wrapping effect if the point of application of power tangentially to the shoe is in rear of the forward end of the shoe, but that the unwrapping effect is produced when the power is applied at the forward end. With my improved construction the location of the aperture K and flanges K' is so selected as to be preferably one-third or one-fourth of the length of the shoe away from its forward end in the direction of movement under compression of the vehicle spring. This will produce only a slight wrapping or self-energizing effect on the brake shoe so that the frictional resistance depends largely upon the tension of the spring L. On the other hand, when the direction of movement is reversed or under recoil of the vehicle spring, the direction of application of the force by the rock arm I will be two-thirds or three-fourths the length of the shoe in rear of the forward end thereof so that a very considerable wrapping or self-energizing effect will be produced. Consequently, the resistance to rotation in this direction is very much greater than the resistance to rotation during compression of the vehicle spring. It is obvious that any desired proportion between the resistance under compression and the resistance upon recoil can be obtained by the location of the aperture K and flanges K' so that my device may be easily adjusted to meet any condition found in the operation of a particular vehicle.

To provide for adjustment in the tension of the springs L the central portion $H^3$ of the shaft H is transversely bored in axial alignment with the springs L and a pair of balls R are placed in this aperture to bear against the disks N. The shaft H is axially bored from its outer end to receive a stem S which has a tapering or conical point S' at its inner end and a threaded portion $S^2$ at its outer end engaging a correspondingly threaded bearing in the bore. By screwing this stem inward the conical portion S' will spread the balls R, thereby moving the abutment disks N outward and increasing the tension on the springs L.

In the modified construction shown in Figure 5 instead of using the wedge shoes O for transmitting the pressure of the springs L to the brake shoes J and J' the springs L are seated on bearings T engaging the shoes radially. Such construction is, however, not as desirable as that shown in Figure 2 as it diminishes the wrapping effect of the shoes during recoil.

The use of lubricant within the housing diminishes the frictional resistance of the shoes when operating through oscillations of small amplitude, inasmuch as under such conditions there is a lubricant film between the shoe and the cylindrical housing E. When, however, the amplitude of oscillation is increased the film of lubricant will be squeezed out to a greater or less extent and the greater the movement, the higher will become the coefficient of friction. This is precisely the effect that is desired to secure easy riding qualities in the vehicle on comparatively smooth roadways and at the same time to prevent the throwing of the body in passing over rough places.

What I claim as my invention is:

1. In a shock absorber, the combination of a plate having a journal bearing therein and a surrounding annular recess, a housing having a cylindrical portion engaging said recess and a hub portion, a bushing in said hub portion, a shaft journalled in said bearing in said plate and said bushing, an arm on said shaft within said housing projecting diametrically of said housing, a pair of shoes frictionally engaging the inner face of the cylindrical portion of said housing and provided with bearings for engaging said arm located at points nearer one end of each shoe than the other end thereof, and means for yieldably pressing said shoes in frictional engagement with said drum.

2. In a shock absorber, the combination of a drum, a shaft journalled concentrically therein, friction shoes arranged within said drum with their ends spaced from each other, spring pressed wedge members between the ends of said shoes for forcing the same in frictional engagement with said drum, and an arm on said shaft extending diametrically across said drum and engaging said friction shoes, the points of engagement being located nearer one end of each shoe than the other.

3. In a shock absorber, the combination of a drum, a shaft journalled concentrically therein, a rock arm on said shaft extending radially within said drum, a friction shoe engaging the inner face of said drum and having a bearing for engaging said rock arm, a spring seated within a recess in said shaft and bearing against said shoe to hold the same in frictional contact with the drum, and means operated from without the drum for adjusting the tension on said spring.

4. In a shock absorber, the combination of a drum, a shaft journalled concentrically therein, a friction shoe within said drum, a rock arm on said shaft engaging said friction shoe to actuate the same, a stem extending inward through an axial passage in said shaft having a threaded engagement with said shaft at its outer end and provided with conical inner end portions, a spring for pressing said shoe in frictional engagement with said drum having its inner end engaging a transverse recess in said shaft which is in communication with said axial passage and an abutment for said spring bearing against the conical end of said stem whereby an adjustment of said stem will alter the tension on said spring.

5. A shock absorber comprising a drum, a shaft journalled concentrically therein having an axially extending aperture within said drum, a rock arm extending from said shaft diametrically across and within said drum at an angle to said transversely extending aperture, shoes within said drum having bearings for engaging said diametrically extending arm, springs for bearing against said shoe to hold the same in frictional contact with the drum, the inner ends of said springs engaging recesses in said shaft in alignment with said transverse aperture, abutments for said springs within said recesses, a pair of balls within said transverse aperture engaging said abutments and a stem extending through said axial passage in said shaft having a threaded engagement therewith and a conical inner end adapted when adjusted inward to wedge between said balls and to increase the tension on said springs.

6. In a shock absorber, the combination of a drum and a shaft journalled concentrically therein, of a friction shoe formed of pressed sheet metal having a segmental portion for engaging the inner face of the drum, and inwardly extending reinforcing flanges tapering from the center towards the opposite ends, said shoe having a portion struck inward from its peripheral portion to form spaced bearings, and a rock arm on said shaft extending into engagement with said spaced bearings to actuate said shoe.

In testimony whereof I affix my signature.

CORNELIUS W. VAN RANST.